United States Patent
Jung et al.

(10) Patent No.: US 11,048,730 B2
(45) Date of Patent: Jun. 29, 2021

(54) DATA CLUSTERING APPARATUS AND METHOD BASED ON RANGE QUERY USING CF TREE

(71) Applicant: SOGANG UNIVERSITY RESEARCH FOUNDATION, Seoul (KR)

(72) Inventors: Sungwon Jung, Seoul (KR); hyeong-cheol Ryu, Seoul (KR)

(73) Assignee: SOGANG UNIVERSITY RESEARCH FOUNDATION, Seoul (KR)

( * ) Notice: Subject to any disclaimer, the term of this patent is extended or adjusted under 35 U.S.C. 154(b) by 34 days.

(21) Appl. No.: 16/546,809

(22) Filed: Aug. 21, 2019

(65) Prior Publication Data

US 2020/0142910 A1    May 7, 2020

(30) Foreign Application Priority Data

Nov. 5, 2018 (KR) .................. 10-2018-0134483

(51) Int. Cl.
*G06F 16/00* (2019.01)
*G06F 16/28* (2019.01)
(Continued)

(52) U.S. Cl.
CPC ........ *G06F 16/285* (2019.01); *G06F 16/2246* (2019.01); *G06F 16/245* (2019.01)

(58) Field of Classification Search
CPC .. G06F 16/285; G06F 16/245; G06F 16/2246; G06F 16/28; G06F 16/22; G06F 16/35
(Continued)

(56) References Cited

U.S. PATENT DOCUMENTS 8,352,483 B1 *  1/2013  Ramesh ............... G06F 16/41
                                                707/758
8,490,030 B1 *  7/2013  Chiang ................ G06F 30/00
                                                716/52
(Continued)

FOREIGN PATENT DOCUMENTS

KR    10-0803769 B1    2/2008
KR    10-0987026 B1    10/2010

OTHER PUBLICATIONS

Korean Office Action for related KR Application No. 10-2018-0134483 dated Jan. 16, 2020 from Korean Intellectual Property Office.
(Continued)

*Primary Examiner* — Thanh-Ha Dang
(74) *Attorney, Agent, or Firm* — Paratus Law Group, PLLC (57) ABSTRACT

Discloses are a data clustering apparatus and method based on a range query using a CF tree. The data clustering apparatus includes a CF tree construction unit configured to construct a CF tree, including a leaf node configured with a micro cluster (MC) and an index node configured with a sub-cluster (SC), based on a plurality of data included in a data set, a micro cluster segment (MCS) generation unit configured to generate an MCS based on a distance between the MCs while sequentially searching the leaf node to a right, and a cluster set generation unit configured to generate a cluster set by performing a range query on the MCS.

10 Claims, 9 Drawing Sheets

(51) Int. Cl.
*G06F 16/245* (2019.01)
*G06F 16/22* (2019.01)

(58) Field of Classification Search
USPC .......................................................... 707/738
See application file for complete search history.

(56) References Cited

U.S. PATENT DOCUMENTS

| | | | | |
|---|---|---|---|---|
| 8,751,499 | B1* | 6/2014 | Carasso | G06F 16/254 |
| | | | | 707/737 |
| 8,892,542 | B2* | 11/2014 | Wang | G06F 16/5838 |
| | | | | 707/707 |
| 9,734,149 | B2* | 8/2017 | Barouni Ebrahimi | |
| | | | | G06F 16/2255 |
| 10,083,230 | B2* | 9/2018 | Contractor | G06F 16/319 |
| 2004/0139067 | A1* | 7/2004 | Houle | G06F 16/35 |
| 2006/0161517 | A1* | 7/2006 | Bhattacharjee | G06F 16/217 |
| 2008/0010304 | A1* | 1/2008 | Vempala | G06F 16/355 |
| 2009/0037440 | A1* | 2/2009 | Will | G06K 9/6219 |
| 2009/0198644 | A1* | 8/2009 | Buchner | G06F 16/3322 |
| 2010/0161614 | A1* | 6/2010 | Choi | G06F 16/90335 |
| | | | | 707/741 |
| 2010/0332210 | A1* | 12/2010 | Birdwell | G06F 16/2228 |
| | | | | 703/22 |
| 2010/0332475 | A1* | 12/2010 | Birdwell | G06F 16/283 |
| | | | | 707/737 |
| 2012/0155441 | A1* | 6/2012 | Rousseau | H04W 72/10 |
| | | | | 370/337 |
| 2012/0221572 | A1* | 8/2012 | Wang | G06F 16/5838 |
| | | | | 707/737 |
| 2013/0097706 | A1* | 4/2013 | Titonis | G06F 21/566 |
| | | | | 726/24 |
| 2014/0229473 | A1* | 8/2014 | Mehrotra | G06F 16/3347 |
| | | | | 707/728 |
| 2015/0154269 | A1* | 6/2015 | Miller | G06F 16/2477 |
| | | | | 715/780 |
| 2015/0286702 | A1* | 10/2015 | Shyr | G06F 16/9027 |
| | | | | 707/737 |
| 2015/0286707 | A1* | 10/2015 | Levitan | G06F 16/9027 |
| | | | | 707/737 |
| 2017/0083920 | A1* | 3/2017 | Zoldi | G06N 20/00 |
| 2017/0123614 | A1* | 5/2017 | Perlegos | H04N 21/2187 |
| 2018/0089561 | A1* | 3/2018 | Oliner | G06N 3/0454 |
| 2018/0267947 | A1* | 9/2018 | Miller | G06F 16/2477 |
| 2018/0322130 | A1* | 11/2018 | Spisic | G06F 16/287 |
| 2018/0336311 | A1* | 11/2018 | Frenkel | G16B 5/00 |

OTHER PUBLICATIONS

Kim Joo-Hyoung et al., "A Quadtree Clustering Algorithm for Efficient Spatial Query Processing", Journal of KIISE (B), Jan. 1998, pp. 204-215, vol. 25, No. 1.

* cited by examiner

```
algorithm Refinement(Q, tree, D, T)
input: A label set Q of microclusters, CF-tree tree, A
    set D of microcluster segments, Threshold value T
output: A set R of final clusters for MCS_a ∈ D do
    ψ_x := MCS_a ∪ RQ(Q, tree, MCS_a, T);
    ψ := ψ ∪ ψ_a;
idx := 1;
while |ψ| > 0 do
    if ψ_a ∈ ψ then
        R_idx := ψ_a, ψ := ψ \ ψ_a;
        for MCS_b ∈ R_idx do
            if ψ_b ∈ ψ then
                R_idx := R_idx ∪ ψ_b, ψ := ψ \ ψ_b;
    R := R ∪ R_idx;
    idx := idx + 1;
```

DATA CLUSTERING APPARATUS AND METHOD BASED ON RANGE QUERY USING CF TREE

CROSS-REFERENCE TO PRIOR APPLICATION

This application claims priority to Korean Patent Application No. 10-2018-0134483 (filed on Nov. 5, 2018), which is incorporated by reference in its entirety.

BACKGROUND

The present invention relates to a data clustering technique based on a range query using a clustering feature (CF) tree and, more particularly, to a data clustering apparatus and method based on a range query using a CF tree, wherein effective clustering is performed based on similarity information between micro clusters of a CF tree.

A data cluster analysis technique, that is, a clustering method, evolves into a method capable of analyzing a large amount of data within a rapid time. With the advent of the big data era, a demand for the clustering method is significantly increased. The clustering method may include a sampling-based clustering method using only some samples of all sets of data, a dimension reduction-based clustering method using only selected attribute values of many attribute values that form data, and a summary-based clustering method (or pre-clustering) for summarizing all sets of data and performing clustering based on the summarized set of data. However, the sampling method has a disadvantage in that its performance is different depending on whether a randomly selected sample can represent the feature of all data precisely. The dimension reduction-based method has a disadvantage in that accuracy is low because an important value is missed.

Korean Patent No. 10-0987026 (Oct. 5, 2010) relates to a macro clustering method and apparatus and a recording medium on which a program for implementing the method is recorded. A bio cluster having a biological function association can be derived using disclosed micro array data, such as the existing GEO or ArrayExpress, without expensive physical microarray experiment.

Korean Patent No. 10-0803769 (Feb. 5, 2008) relates to a method for clustering and searching for media items and is a technique for arranging, showing, and searching for media items organized within hierarchical multi-dimensional clusters in mobile terminals. The media items are arranged through multi-dimensional clustering. The first entry is defined and queried with respect to one dimension. A next entry is based on a different dimension from media items that satisfy the first entry.

PRIOR ART DOCUMENT

Patent Document

Korean Patent No. 10-0987026 (Oct. 5, 2010)
Korean Patent No. 10-0803769 (Feb. 5, 2008)

SUMMARY

The present invention provides a data clustering apparatus and method based on a range query using a CF tree, wherein effective clustering is performed based on similarity information between micro clusters of a CF tree.

The present invention provides a data clustering apparatus and method based on a range query using a CF tree, which can provide high clustering performance suitable for a set of a large amount of data through segmentation and a refinement process for micro clusters configuring a CF tree.

The present invention provides a data clustering apparatus and method based on a range query using a CF tree, which can perform effective data clustering by generating a micro cluster segment based on an inter-microcluster distance (IMD) and detecting a directly or indirectly connected micro cluster segment through a range query.

In an aspect, a data clustering apparatus and method based on a range query using a CF tree includes a CF tree construction unit configured to construct a CF tree, including a leaf node configured with a micro cluster (MC) and an index node configured with a sub-cluster (SC), based on a plurality of data included in a data set, a micro cluster segment (MCS) generation unit configured to generate an MCS based on a distance between the MCs while sequentially searching the leaf node to a right, and a cluster set generation unit configured to generate a cluster set by performing a range query on the MCS.

The CF tree construction unit may be configured to calculate a radius for the SC after the construction is completed.

The CF tree construction unit may be configured to use an average radius of a corresponding MC if a child of the SC is an MC and to use a radius of a corresponding SC if a child of the SC is an SC in the calculation of the radius.

The MCS generation unit may be configured to calculate the inter-MC distance (IMD) using an equation below.

$$IMD(MC_x, MC_y) = ED(c(MC_x), c(MC_y)) - (ar(MC_x) + ar(MC_y)) \quad \text{[Equation]}$$

In this equation, $MC_x$ and $MC_y$ correspond to MCs, $c(MC)$ and $ar(MC)$ correspond to a centroid and average radius of a corresponding MC, and $ED(c(MC_x), c(MC_y))$ corresponds to an Euclidean distance (ED) between centroids of two MCs.

The MCS generation unit may be configured to add first and second MCs to an identical MCS if a distance between the first and second MCs is smaller than a threshold distance.

The MCS generation unit may be configured to calculate a centroid of the MCS as an average value of centroids of a plurality of MCs included in the MCS and to calculate a radius of the MCS as a greatest value of sums of a distance from a centroid of the MCS to a centroid of each MC and an average radius of each MC.

The cluster set generation unit may be configured to determine a plurality of MC candidates which overlap a range area, having a sum of a radius of the MCS and a threshold distance as a radius based on a centroid of the MCS, and are included in an external MCS.

The cluster set generation unit may be configured to add an external MCS, including a corresponding MC candidate, to a partial cluster set associated with the MCS if a distance between the MC candidate and at least one of MCs included in the MCS is within the threshold distance.

The cluster set generation unit may be configured to generate the cluster set by integrating a plurality of partial cluster sets, including an identical MCS, into one.

In an aspect, a data clustering method based on a range query using a CF tree includes constructing a CF tree, including a leaf node configured with a micro cluster (MC) and an index node configured with a sub-cluster (SC), based on a plurality of data included in a data set, generating an MCS based on a distance between the MCs while sequentially searching the leaf node to a right, and generating a cluster set by performing a range query on the MCS.

DETAILED DESCRIPTION

The description of the present invention is merely an embodiment for a structural and/or functional description. The range of right of the present invention should not be construed as being limited to embodiments described in the context. That is, the range of right of the present invention should be construed as including equivalents which may realize the technical spirit because an embodiment may be modified in various ways and may have various forms. Furthermore, an object or effect proposed in the present invention does not mean that a specific embodiment must include all objects or effects or include only such a corresponding effect. Accordingly, the range of right of the present invention should not be understood as being restricted thereby.

The meaning of terms described in this application should be construed as follows.

The terms, such as the "first" and the 'second", are used to distinguish one element from the other element, and the range of right of the present invention should not be restricted by the terms. For example, a first element may be named a second element. Likewise, a second element may be named a first element.

When it is said that one element is described as being "connected" to the other element, the one element may be directly connected to the other element, but it should be understood that a third element may be interposed between the two elements. In contrast, when it is described that one element is described as being "directly connected" to the other element, it should be understood that a third element is not interposed between the two elements. Meanwhile, the same principle applies to other expressions, such as "between ~" and "just between ~" or "adjacent to ~" and "adjacent just to ~", which describe a relation between elements.

An expression of the singular number should be understood to include plural expressions, unless clearly expressed otherwise in the context. The terms, such as "include" or "have", should be understood to indicate the existence of a set characteristic, number, step, operation, element, part, or a combination of them and not to exclude the existence of one or more other characteristics, numbers, steps, operations, elements, parts, or a combination of them or a possibility of the addition of them.

In each of steps, symbols (e.g., a, b, and c) are used for convenience of a description, and the symbols do not describe order of the steps. The steps may be performed in order different from order described in the context unless specific order is clearly described in the context. That is, the steps may be performed according to described order, may be performed substantially at the same time, or may be performed in reverse order.

The present invention may be implemented in a computer-readable recording medium in the form of computer-readable code. The computer-readable recording medium includes all types of recording devices in which data readable by a computer system is stored. The computer-readable recording medium may include ROM, RAM, CD-ROM, magnetic tapes, floppy disks, and optical data storages, for example. Furthermore, the computer-readable recording medium may be distributed to computer systems connected over a network, and the computer-readable code may be stored and executed in the computer systems in a distributed manner.

All the terms used herein, including technological or scientific terms, have the same meanings as those that are typically understood by those skilled in the art, unless otherwise defined. Terms, such as ones defined in common dictionaries, should be construed as having the same meanings as those in the context of related technology and should not be construed as having ideal or excessively formal meanings, unless clearly defined in the specification.

Figure 1:
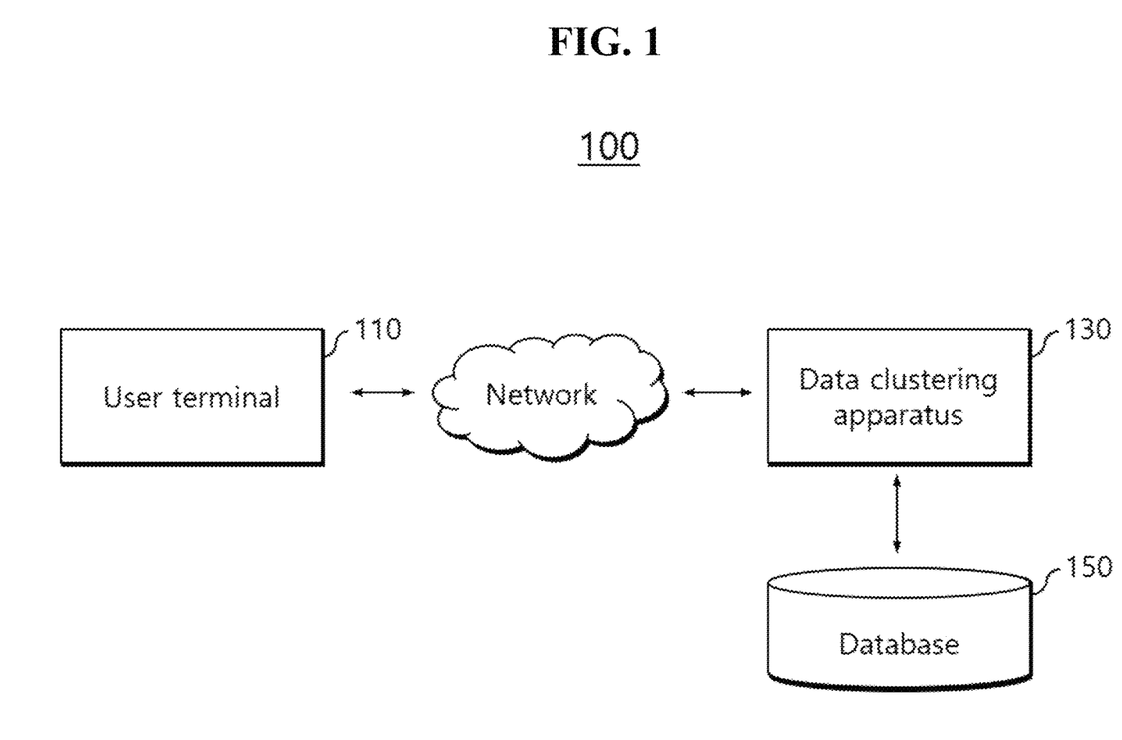
FIG. 1 is a diagram illustrating a data clustering system based on a range query using a CF tree according to an embodiment of the present invention.

FIG. 1 is a diagram illustrating a data clustering system based on a range query using a CF tree according to an embodiment of the present invention.

Referring to FIG. 1, the data clustering system 100 based on a range query using a CF tree may include a user terminal 110, a data clustering apparatus 130 and a database 150.

The user terminal 110 corresponds to a computing device capable of checking clustering resulting by providing a large amount of data, and may be implemented as a smartphone, a laptop computer or a computer, but is not essentially limited thereto. The user terminal may also be implemented as various devices, such as a tablet PC. The user terminal 110 may be connected to the data clustering apparatus 130 over a network. A plurality of the user terminals 110 may be connected to the data clustering apparatus 130 at the same time.

The data clustering apparatus 130 may be implemented as a server corresponding to a computer or program which can effectively perform data clustering on a set of a large amount of data using a CF tree. The data clustering apparatus 130 may be connected to the user terminal 110 over a wired network or a wireless network, such as Bluetooth or Wi-Fi, and may perform communication with the user terminal 110 over a wired or wireless network.

In an embodiment, the data clustering apparatus 130 may store data necessary to perform clustering regarding a large amount of data in association with the database 150. Unlike in FIG. 1, the data clustering apparatus 130 may be implemented to include the database 150 therein. Furthermore, the data clustering apparatus 130 may perform clustering regarding a large amount of data stored in the database 150 although data is not provided by the user terminal 110, and may be implemented to include a processor, a memory, a user input/output unit and a network input/output unit.

The database 150 may store a variety of types of information necessary for the data clustering apparatus 130 to perform a process of performing clustering regarding a set of a large amount of data. For example, the database 150 may store a set of a large amount of data, that is, the subject of clustering, may store information on a CF tree constructed based on a large amount of data, but the present invention is not limited thereto. The database may store pieces of information collected or processed in various forms in a process of performing data clustering based on a range query using a constructed CF tree.

Figure 2:
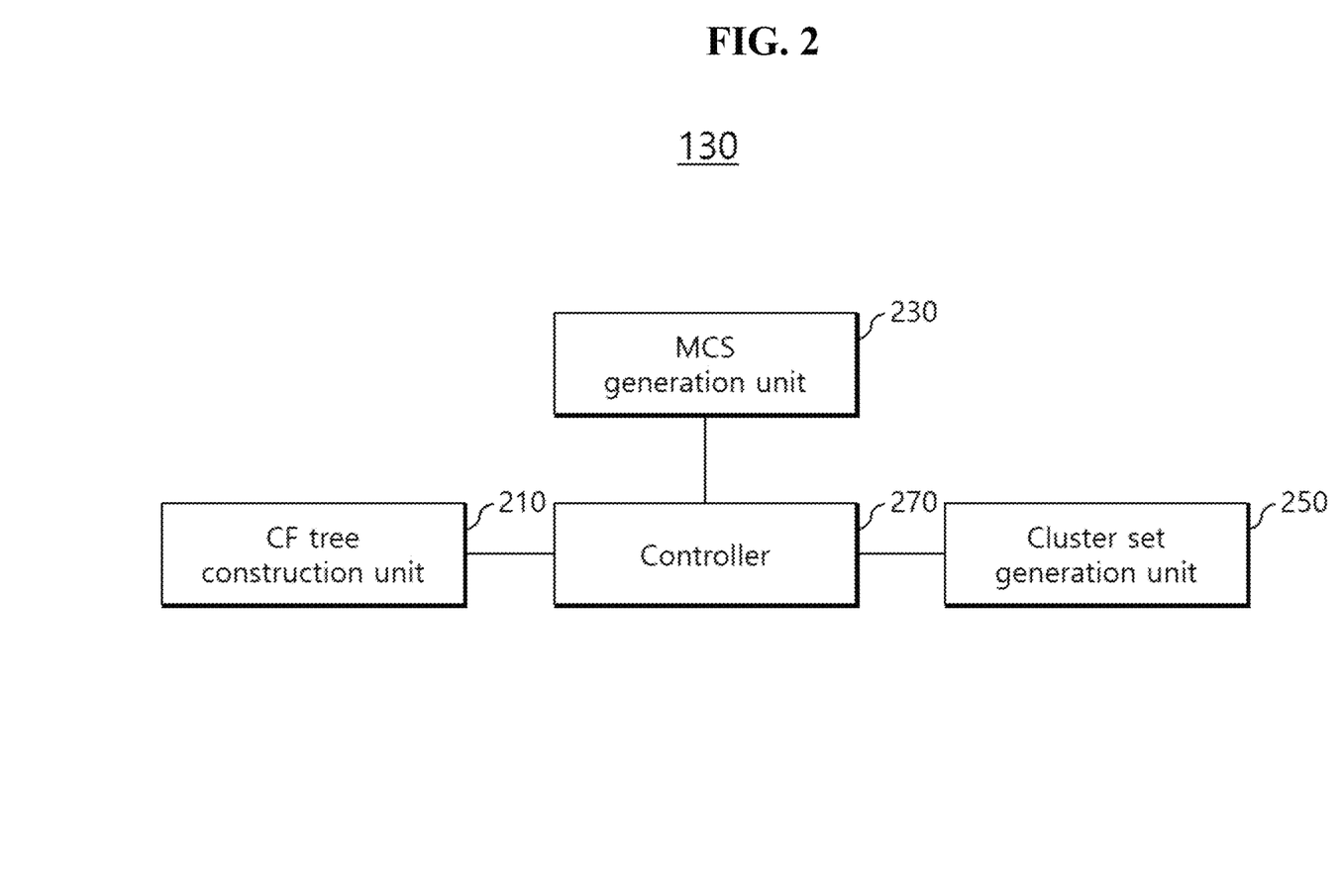
FIG. 2 is a block diagram illustrating a data clustering apparatus of FIG. 1.

FIG. 2 is a block diagram illustrating the data clustering apparatus of FIG. 1.

Referring to FIG. 2, the data clustering apparatus 130 may include a CF tree construction unit 210, a micro cluster segment (hereinafter referred to as "MCS") generation unit 230, a cluster set generation unit 250 and a controller 270.

The CF tree construction unit 210 may construct a clustering feature (hereinafter referred to as a "CF") tree, including a leaf node configured with a micro cluster (hereinafter referred to as an "MC") and an index node configured with a sub-cluster (hereinafter referred to as an "SC") based on a plurality of data included in a data set. The CF tree corresponds to a tree configured with CF vectors. The CF vector is a value including data within a cluster, and may be used to compute the centroid (c) and average radius (ar) of each cluster.

The leaf node of a CF tree constructed by the CF tree construction unit 210 may include an MC, that is, the smallest entry of data, as an entry, and may be represented through a CF vector like other entries. Furthermore, the index node may correspond to an internal node having a leaf node or an index node as a child, and may include an SC as an entry. The CF tree may be configured with an index node, corresponding to an internal node, and a leaf node like a B$^+$ tree, but may manage an MC not data unlike the B$^+$ tree.

In an embodiment, if the construction of a CF tree is completed, the CF tree construction unit 210 may calculate the radius of all SCs configuring the CF tree. The radius of an SC may be used for a range query using a CF tree, and may be used as a method for avoiding the calculation of all inter-microcluster distance (hereinafter referred to as "IMDs") if the range query is performed. In this case, each node configuring the CF tree may be declared in a form that additionally includes information on the radius of the SC, and may be used for the construction of a CF tree.

In an embodiment, in a radius calculation process, the CF tree construction unit 210 may use an average radius of a corresponding MC if a child of a specific SC is an MC, and may use the radius of a corresponding SC if a child of a specific SC is an SC. For example, in an index node, if $SC_i$, that is, an i-th SC, is configured with C clusters, that is, $C_1, \ldots, C_c$, and ED ($c(C_i)$, $c(C_j)$) is an Euclidean distance (hereinafter referred to as an "ED") between $c(C_i)$ and $c(C_j)$, the radius $SC_i.r$ of the $SC_i$ may be defined as follows.

$$SC_i.r = \begin{cases} \max_{1 \le j \le c} [ED(c(SC_i), c(C_j)) + ar(C_j)] & \text{if } C_j \text{ is a microcluster} \\ \max_{1 \le j \le c} [ED(c(SC_i), c(C_j)) + C_j.r] & \text{otherwise.} \end{cases}$$

In particular, if a child is an SC, the CF tree construction unit 210 may search for a child of the child, may calculate a radius, and may repeatedly perform such a process recursively until a child is an MC. After a CF tree is constructed, the CF tree construction unit 210 may calculate the radius of all SCs within a tree by searching all trees once. The radius of each SC may be represented in a circle form including MCs corresponding to all the descents of a corresponding SC.

The MCS generation unit 230 may generate an MC segment (hereinafter referred to as an "MCS") based on an IMD while sequentially searching a leaf node to the right. As in a B$^+$ tree, in a CF tree, all leaf nodes may be implemented in a connection list form. Accordingly, the leaf nodes can be sequentially searched and may be searched from the leftmost leaf node of the CF tree to the right along the link. Each MC may be searched for while performing the search within each leaf node from the left to the right.

Furthermore, the MCS generation unit 230 may generate an MCS for each MC based on the distance from the MC corresponding to a right brother. In this case, the MCS may correspond to a set regarding MCs whose IMD is within a threshold distance. The threshold distance may be previously set by the data clustering apparatus 130.

In an embodiment, the MCS generation unit 230 may calculate an IMD using the following equation.

$$IMD(MC_x, MC_y) = ED(c(MC_x), c(MC_y)) - (ar(MC_x) + ar(MC_y))$$ [Equation]

In this equation, $MC_x$ and $MC_y$ correspond to MCs, c(MC) and ar(MC) correspond to the centroid and average radius of a corresponding MC, and $ED(c(MC_x), c(MC_y))$ corresponds to an Euclidean distance (hereinafter referred to as an "ED") between the centroids of two MCs. As a result, the IMD may be calculated as a value obtained by subtracting an average radius of each MC from the ED between the centroids of two MCs.

In an embodiment, the MCS generation unit 230 may add first and second MCs to the same MCS if a distance between the first and second MCs is smaller than a threshold distance. The MCS generation unit 230 may perform the classification of MCs by comparing the distance between neighboring two MCs with a threshold distance. As a result, the MCS generation unit 230 may classify MCs as the same MCS if the IMD between the MCs is closer than a threshold distance, and may classify the MCs as different MCSs if the IMD is not closer than the threshold distance. The MCS generation unit 230 may generate a plurality of MCSs by performing classification of all MCs included in a leaf node.

In an embodiment, the MCS generation unit 230 may calculate the centroid of an MCS as an average value of the centroids of a plurality of MCs included in the MCS, and may calculate the radius of the MCS as the greater value of the sums of the distance from the centroid of the MCS to the centroid of each MC and the average radii of MCs. The MCS corresponds to a set including a plurality of MCs, and may be represented as representative values, that is, the centroid and radius, like an MC. If a plurality of MCSs is generated by the MCS generation unit 230, each MCS may be represented as values of the centroid and the radius.

For example, assuming that an MCS, is configured with k MCs, that is, $MC_1, \ldots, MC_k$, the centroids and average radii of respective MCs are $c(MC_1), \ldots, c(MC_k)$ and $ar(MC_1), \ldots, ar(MC_k)$, the centroid of the $MCS_i$ may be represented as $MCS_i.c$, and the radius thereof may be represented as $MCS_i.r$, which may be calculated using Equations (1) and (2), respectively.

$$MCS_i.c = \frac{\sum_{y=1}^{k} c(MC_y)}{k} \quad (1)$$

-continued $$MCS_{i,r} = \max_{1 \leq y \leq k} \{ED(c(MC_y), MCS_{i,c}) + ar(MC_y)\} \quad (2)$$

In this case, ED(c($MC_y$), $MCS_i$.c) may correspond to an ED between c($MC_y$) and $MCS_i$.c.

The cluster set generation unit 250 may generate a cluster set by performing a range query on an MCS. In particular, when an IMD value for all pairs between MCSs is smaller than a threshold distance, it may be defined that two MCSs have been connected. In this case, the MCSs may be connected directly or indirectly. The cluster set generation unit 250 may generate a cluster set by integrating the directly or indirectly connected MCSs into one. The cluster set generation unit 250 may perform a range query in order to avoid the calculation of all IMDs.

In an embodiment, the cluster set generation unit 250 may determine a plurality of MC candidates that overlap a range area having the sum of the radius of an MCS and a threshold distance as a radius on the basis of the centroid of a specific MCS and that are included in an external MCS. The external MCS may correspond to an MCS different from the specific MCS. The specific MCS and the external MCS do not overlap each other. For example, the cluster set generation unit 250 may detect all MCs, overlapping a virtual circle having MCS.c, that is, the centroid of an MCS, as the centroid and having the sum of the radius MCS.r of the MCS and a threshold distance T as a radius, as MC candidates.

In an embodiment, if the distance between a MC candidate and at least one of MCs included in a specific MCS is within a threshold distance, the cluster set generation unit 250 may add an external MCS, included in the corresponding MC candidate, to a partial cluster set associated with the specific MCS. The cluster set generation unit 250 may generate the partial cluster set by detecting MCSs directly connected to the specific MCS.

In this case, the partial cluster set is a set including MCSs directly connected to the specific MCS, and may correspond to an intermediate set for generating the final cluster set. For example, if specific $MCS_a$ and $MCS_c$ are directly connected and $MCS_a$ and $MCS_d$ are directly connected, the $MCS_c$ and the $MCS_d$ may be included in a partial cluster set regarding the $MCS_a$ corresponding to the key of a range query.

In an embodiment, the cluster set generation unit 250 may generate a cluster set by integrating a plurality of partial cluster sets, including the same MCS, into one. The cluster set generation unit 250 may generate a partial cluster set for all MCSs. Each partial cluster set includes only an MCS directly connected to an MCS corresponding to the key of a range query. Accordingly, the cluster set generation unit 250 may generate the final cluster set by merging a plurality of partial cluster sets, including the same MCS, into one. Accordingly, a cluster set generated by the cluster set generation unit 250 includes all of directly or indirectly connected MCSs, and the same MC is not included between different cluster sets.

The controller 270 may control an overall operation of the data clustering apparatus 130, and may manage a control flow or data flow between the CF tree construction unit 210, the MCS generation unit 230 and the cluster set generation unit 250.

Figure 3:
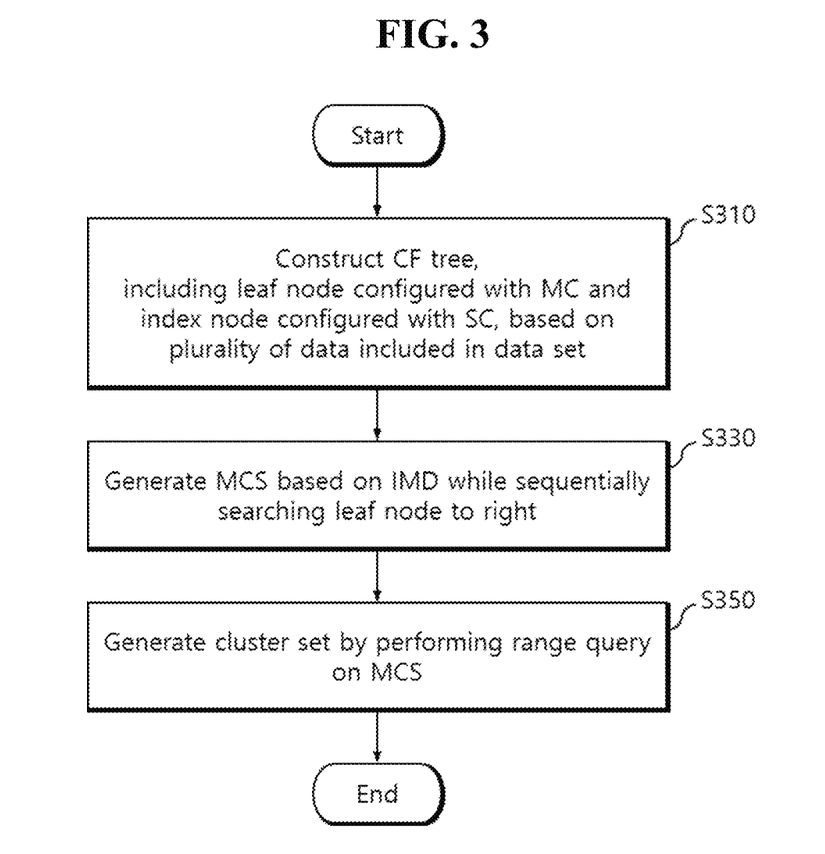
FIG. 3 is a flowchart illustrating a data clustering process performed by the data clustering apparatus of FIG. 1.

FIG. 3 is a flowchart illustrating a data clustering process performed by the data clustering apparatus of FIG. 1.

Referring to FIG. 3, the data clustering apparatus 130 may construct a CF tree, including a leaf node configured with an MC and an index node configured with an SC, based on a plurality of data included in a data set through the CF tree construction unit 210 (step S310). The data clustering apparatus 130 may generate an MCS based on an IMD while sequentially searching the leaf node to the right through the MCS generation unit 230 (step S330). The data clustering apparatus 130 may generate a cluster set by performing a range query on the MCS through the cluster set generation unit 250 (step S350).

Figure 4:
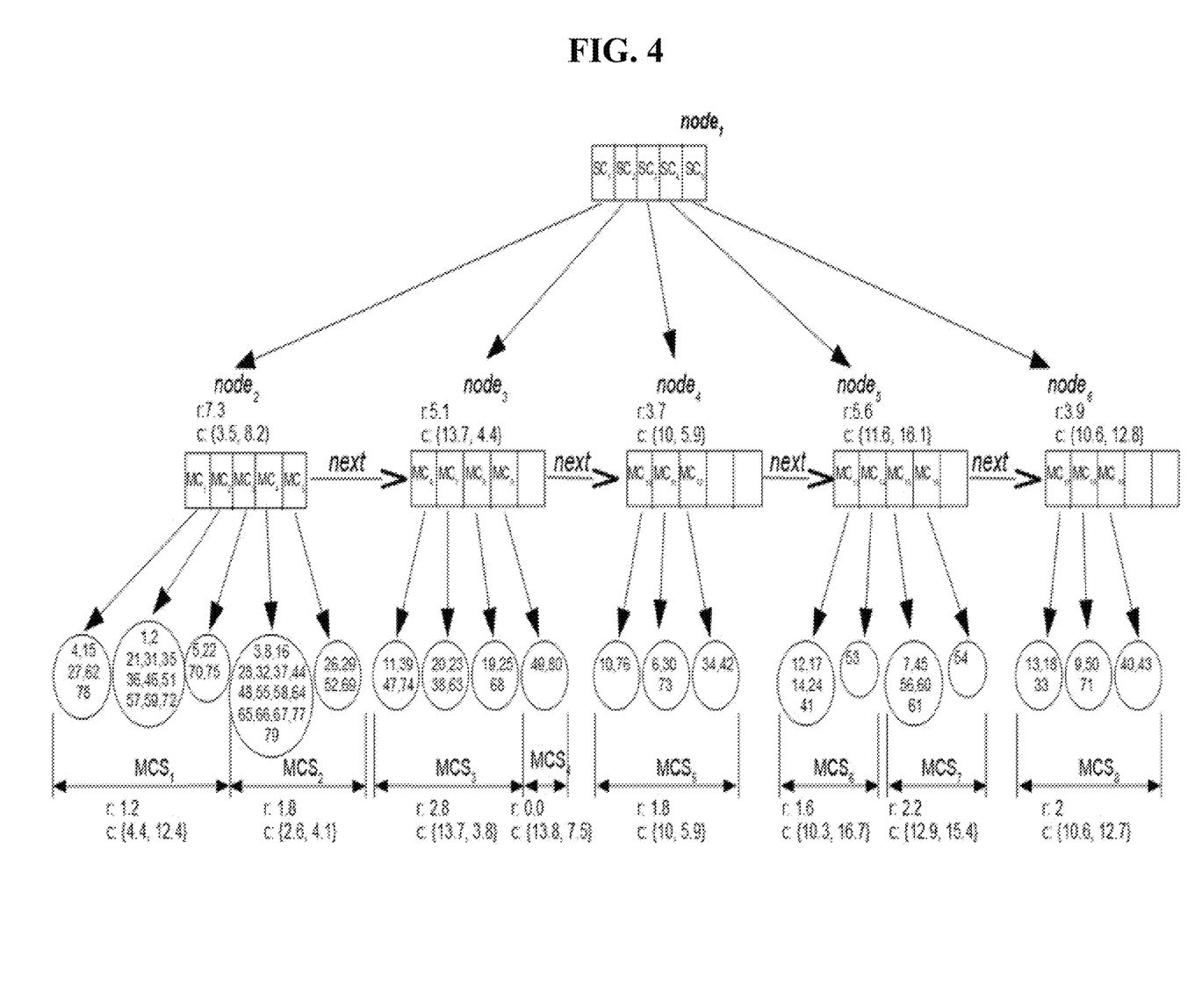
FIG. 4 is a diagram illustrating an embodiment of a CF tree used in the data clustering apparatus of FIG. 1.

FIG. 4 is a diagram illustrating an embodiment of a CF tree used in the data clustering apparatus of FIG. 1.

Referring to FIG. 4, the CF tree corresponds to a tree configured with CF vectors used to summarize the features of a cluster in a representative summary-based clustering method. The CF vector is a value formed of data within the cluster, and may be represented as representative values, such as the centroid (c) and average radius (ar) of each cluster.

The leaf entry of the CF tree constructed by the data clustering apparatus 130 is an MC, that is, the smallest cluster of data, and may be represented through the CF vector like other entries. Each MC may correspond to a small cluster, that is, a bundle of data closer to its own centroid than to a threshold T. The data clustering apparatus 130 may search for the closest MC through a CF tree with respect to input data for clustering. If the distance between the input data and the centroid of the MC is smaller than the threshold T, the data clustering apparatus may incorporate the input data into the MC.

Furthermore, the incorporated data may be incorporated into the CF vector of the MC. The centroid and average radius of the MC may also be changed depending on the input data. If the distance between the input data and the centroid of the MC is greater than the threshold T, the data clustering apparatus 130 may generate a new MC based on the input data. MCs newly generated by the data clustering apparatus 130 may be included in a leaf node of the CF tree. Such leaf nodes may be represented by an SC. As a result, the probability that MCs at a close distance may gather together depending on the locality of a CF tree may be high.

In FIG. 4, the CF tree may correspond to a tree having a $node_1$ as a root node. The root node may correspond to an index node whose entries are an SC. Furthermore, the CF tree includes $node_2, \ldots, node_6$ as leaf nodes. Each of the leaf nodes may have its entries configured with MCs. The leaf nodes may be connected through a link called "next." Each of the leaf nodes $node_2, \ldots, node_6$ may have a centroid c and a radius r, which may be calculated based on the centroids and radii of MCs belonging to a corresponding leaf node, and may be used as information on an SC, that is, the parent of the corresponding leaf node.

Figure 5:
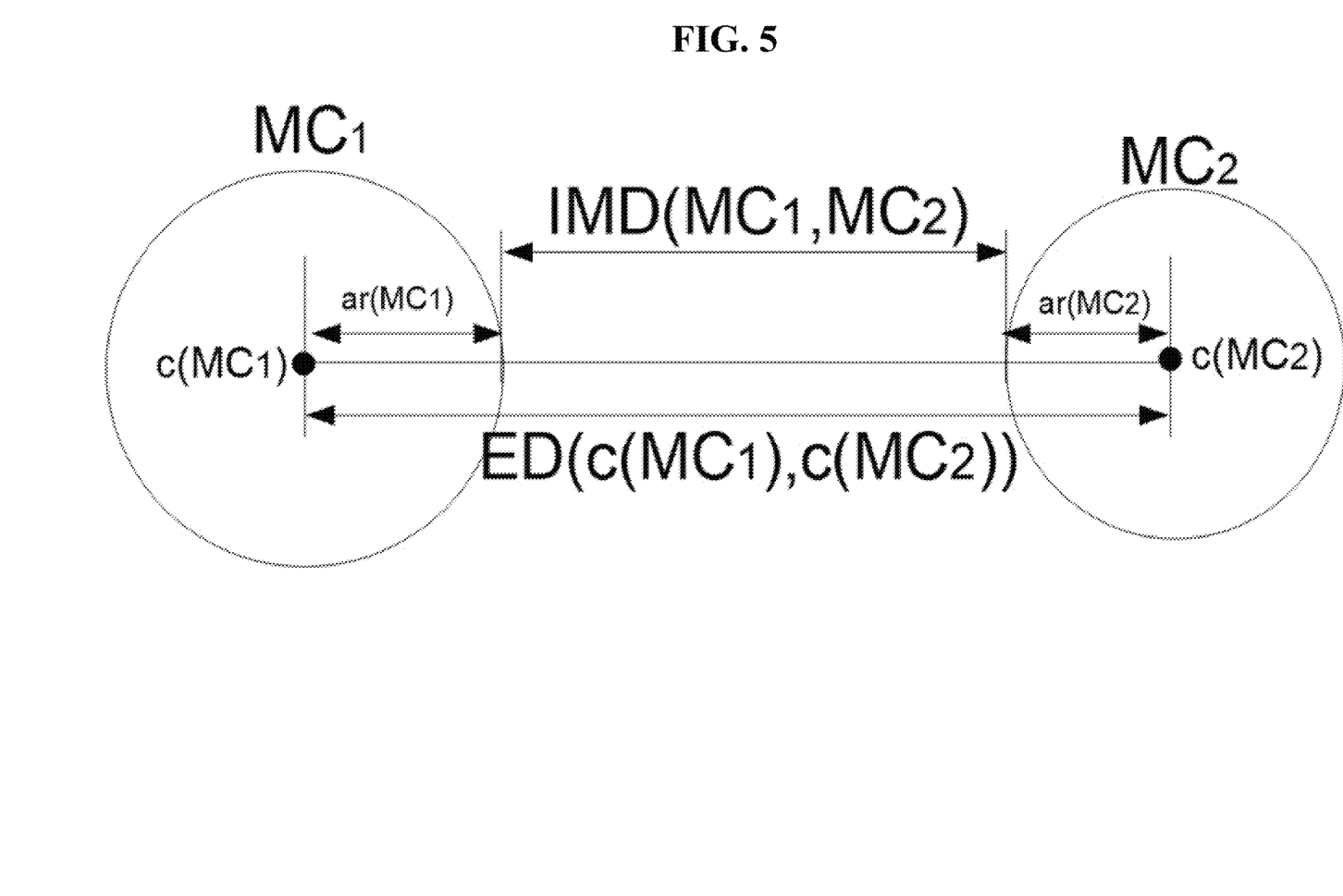
FIG. 5 is an exemplary diagram illustrating an IMD used in a CF tree construction process.

FIG. 5 is an exemplary diagram illustrating an IMD used in a CF tree construction process.

Referring to FIG. 5, the data clustering apparatus 130 may use an IMD in a process of constructing a CF tree and performing data clustering. The IMD may be calculated using the centroid and average radius of an MC. More specifically, the data clustering apparatus 130 may calculate a value, obtained by subtracting an average radius of each MC from an ED between the centroids of two MCs, as the IMD through the MCS generation unit 230.

In FIG. 5, the centroids and average radii of two MCs $MC_1$ and $MC_2$ correspond to c($MC_1$) and ar($MC_1$), and c($MC_2$)) and ar($MC_2$), respectively. The IMD ($MC_1$ and $MC_2$) may be calculated as a value obtained by subtracting ar($MC_1$)+ar($MC_2$), that is, the sum of average radii of the two MCs, from an ED (c($MC_1$), c($MC_2$)), that is, an ED between the centroids of the two MCs.

Figure 6:
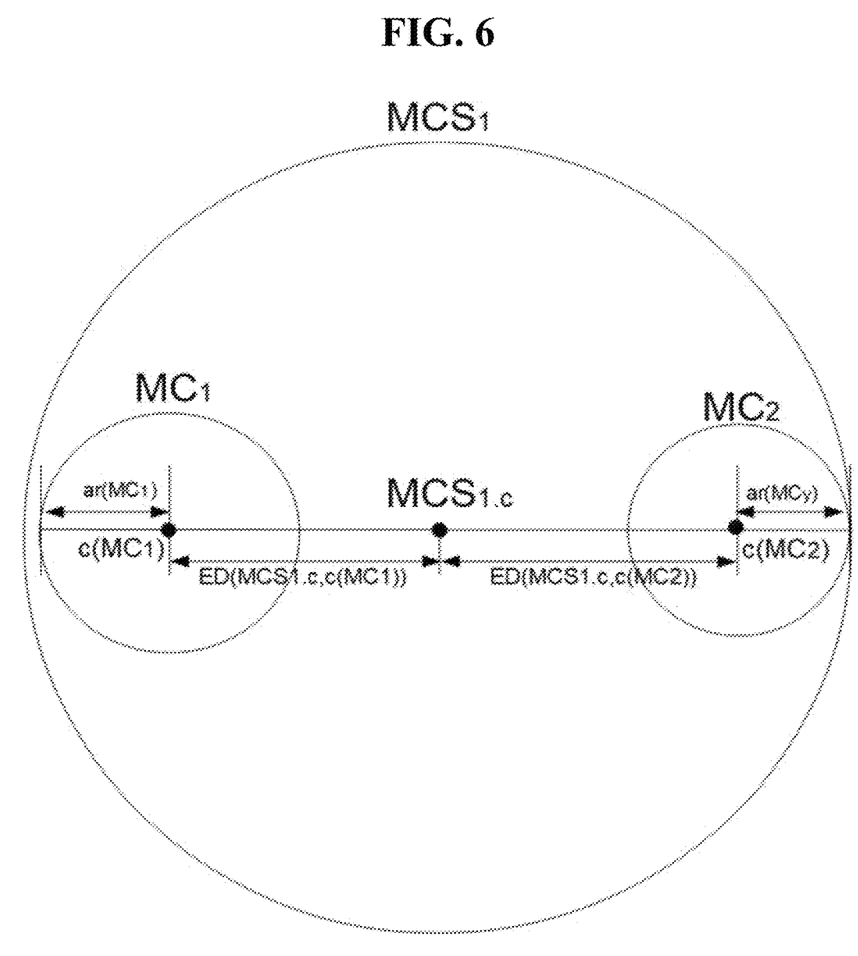
FIG. 6 is an exemplary diagram illustrating a micro cluster segment used in a CF tree construction process.

FIG. 6 is an exemplary diagram illustrating an MCS used in a CF tree construction process.

Referring to FIG. 6, the data clustering apparatus 130 may generate an MCS based on an IMD, while sequentially searching a leaf node of a CF tree to the right, through the MCS generation unit 230. More specifically, the MCS generation unit 230 may sequentially search for all MCs through a next pointer of a leaf node, and may check whether the distance from an MC, that is, a right brother, is smaller than a threshold T with respect to each MC. If the distance is smaller than the threshold T, the MCS generation unit 230 may group two MCs into the same MCS.

In FIG. 6, the centroid of an $MCS_1$ corresponds to $MCS_1.c$, and may be calculated as an average value of the centroids of MCs included in the $MCS_1$. Furthermore, the radius of the $MCS_1$ corresponds to $MCS_1.r$, and may be calculated as the greatest value of the sums of the distance from the $MCS_1.c$ to each MC and the radius of each MC. $MCS_1.r$ may correspond to an ED $(MCS_1.c, c(MC_2))+ar(MC_2)$ because the sum of the distance between $MCS_1.c$ and the centroid of $MC_2$ and the radius of $MC_2$ is the greatest.

Figure 7:
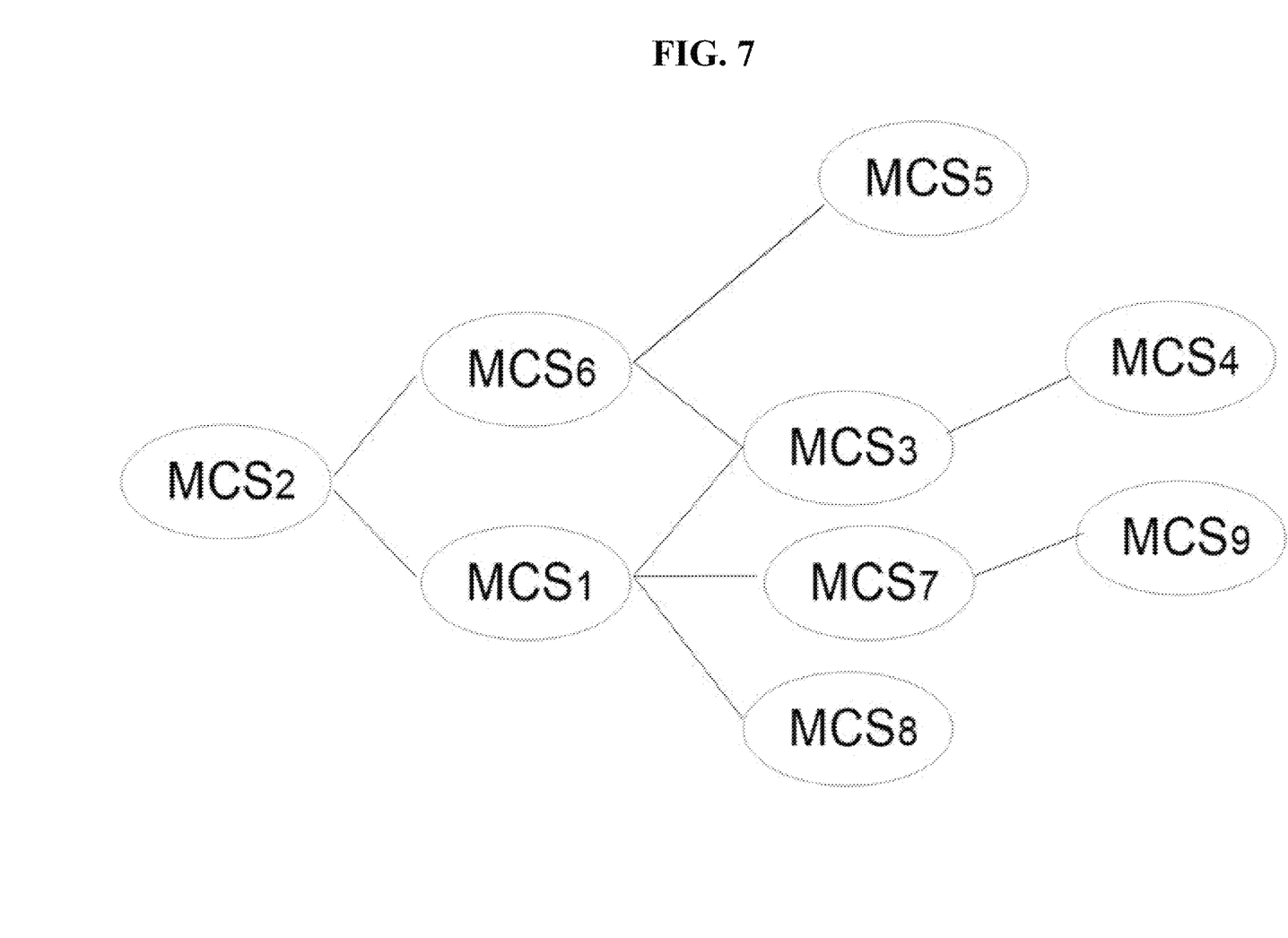
FIG. 7 is an exemplary diagram illustrating a connection relationship between micro cluster segments used in a CF tree construction process.

FIG. 7 is an exemplary diagram illustrating a connection relationship between MCSs used in a CF tree construction process.

Referring to FIG. 7, there may be a connection relation between MCSs. More specifically, if a value of an IMD for all pairs between MCSs is smaller than a threshold T, it may be defined that two MCSs have been connected. Furthermore, the connection relation between MCSs may be classified as a direction connection or an indirect connection. In FIG. 7, an $MCS_2$ is directly connected to an $MCS_1$ and an $MCS_6$, and is indirectly connected to the remaining MCSs.

Figure 8:
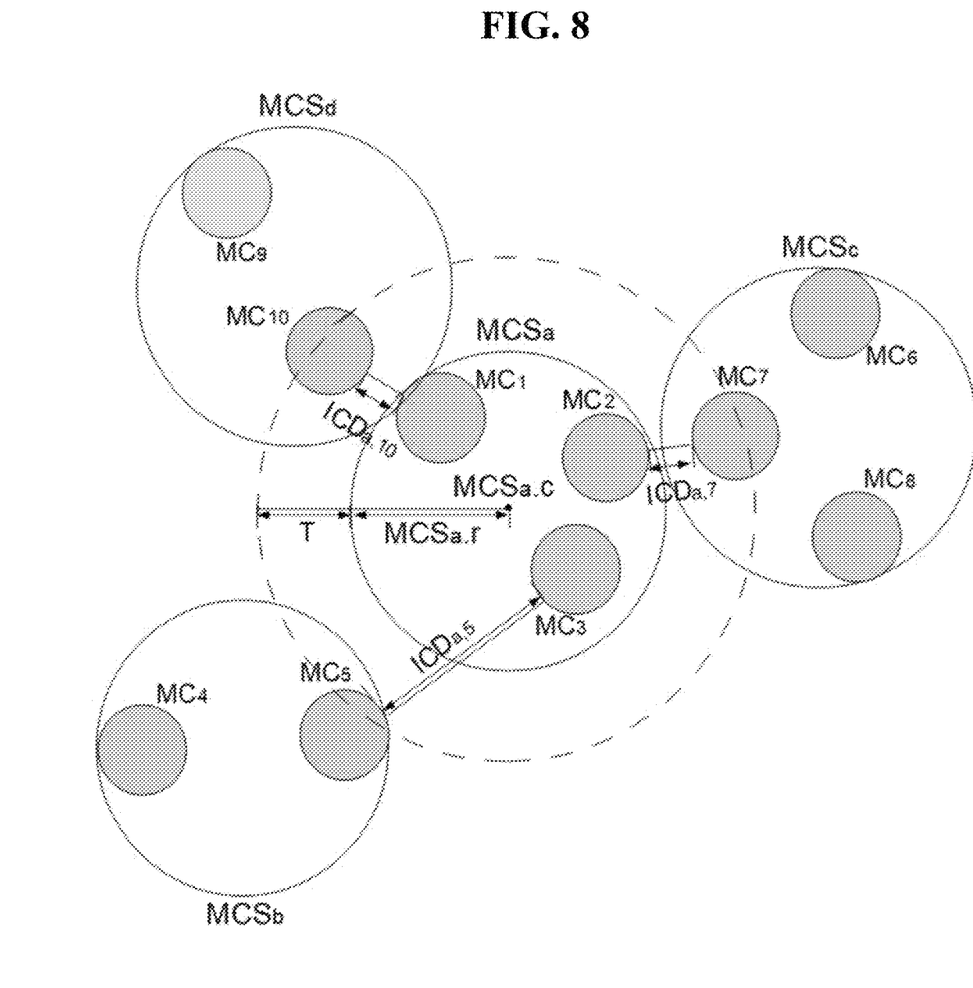
FIG. 8 is an exemplary diagram illustrating a process of performing a range query on a micro cluster segment in the data clustering apparatus of FIG. 1.

FIG. 8 is an exemplary diagram illustrating a process of performing a range query on an MCS in the data clustering apparatus of FIG. 1.

Referring to FIG. 8, the data clustering apparatus 130 may generate a cluster set by performing a range query on an MCS through the cluster set generation unit 250. The data clustering apparatus 130 may perform a range query using a CF tree in order to avoid the calculation of all IMDs. To this end, the data clustering apparatus 130 may perform a process of constructing a CF tree through the CF tree construction unit 210 and then calculating the radius of each SC.

The entry of a node of a CF tree may correspond to a form of an SC or MC. In FIG. 4, an $SC_1$ has MCs $MC_1$~$MC_5$ as children. The CF tree construction unit 210 may use an average radius of a corresponding MC if a child is an MC, and may use a radius in other cases. That is, if a child is an SC, the CF tree construction unit 210 may calculate a radius by searching for a child of the child, and may repeatedly perform such a process recursively until a child is an MC. Accordingly, the CF tree construction unit 210 may calculate the radius for all SCs within a tree by searching all trees once. The obtained radius becomes a circle form including MCs corresponding to all of its descendants. The circle form may be similar to the MCS of FIG. 6.

The data clustering apparatus 130 may perform a range query on all MCSs through the cluster set generation unit 250. The cluster set generation unit 250 may select, as a candidate group, all MCs that overlap a virtual circle having $MCS_a.c$, that is, the centroid of an $MCS_a$, as a centroid and having the sum of the radius $MCS_a.r$ of the $MCS_a$ and a threshold T as a radius. In FIG. 8, MCs $MC_5$, $MC_7$ and $MC_{10}$ may be determined as an MC candidate group. In this case, an ICD between an $MCS_i$ and an $MC_y$ may be defined as follows.

$$ICD_{i,y} = \min_{MC \in MCS_i} IMD(MC, MC_y)$$

Thereafter, the cluster set generation unit 250 may check whether the IMD between all the MCs ($MC_1$, $MC_2$, $MC_3$) of the $MCS_a$ and the candidate group MC is smaller than a threshold T. If the IMD is smaller than the threshold T, an MCS having an overlapped MC may be connected to the $MCS_a$, that is, a key for search. In FIG. 8, an $MCS_a$ (having an $MC_2$) and an $MCS_c$ (having an $MC_7$) may be connected, and an $MCS_a$ (having an $MC_1$) and an $MCS_d$ (having an $MC_{10}$) may be connected. The cluster set generation unit 250 may generate a partial cluster set by merging the connected MCSs into a single set.

Furthermore, the partial cluster set includes only MCSs directly connected to an MCS corresponding to a key of a range query. Accordingly, the cluster set generation unit 250 may perform a merge task for searching for an indirect connection, such as the indirect connection of $MCS_2$ and $MCS_5$ in FIG. 7. The cluster set generation unit 250 may generate the final cluster set by performing a process of selecting sets that share the same MCS in all partial cluster sets and merging the selected sets into one.

Figure 9:
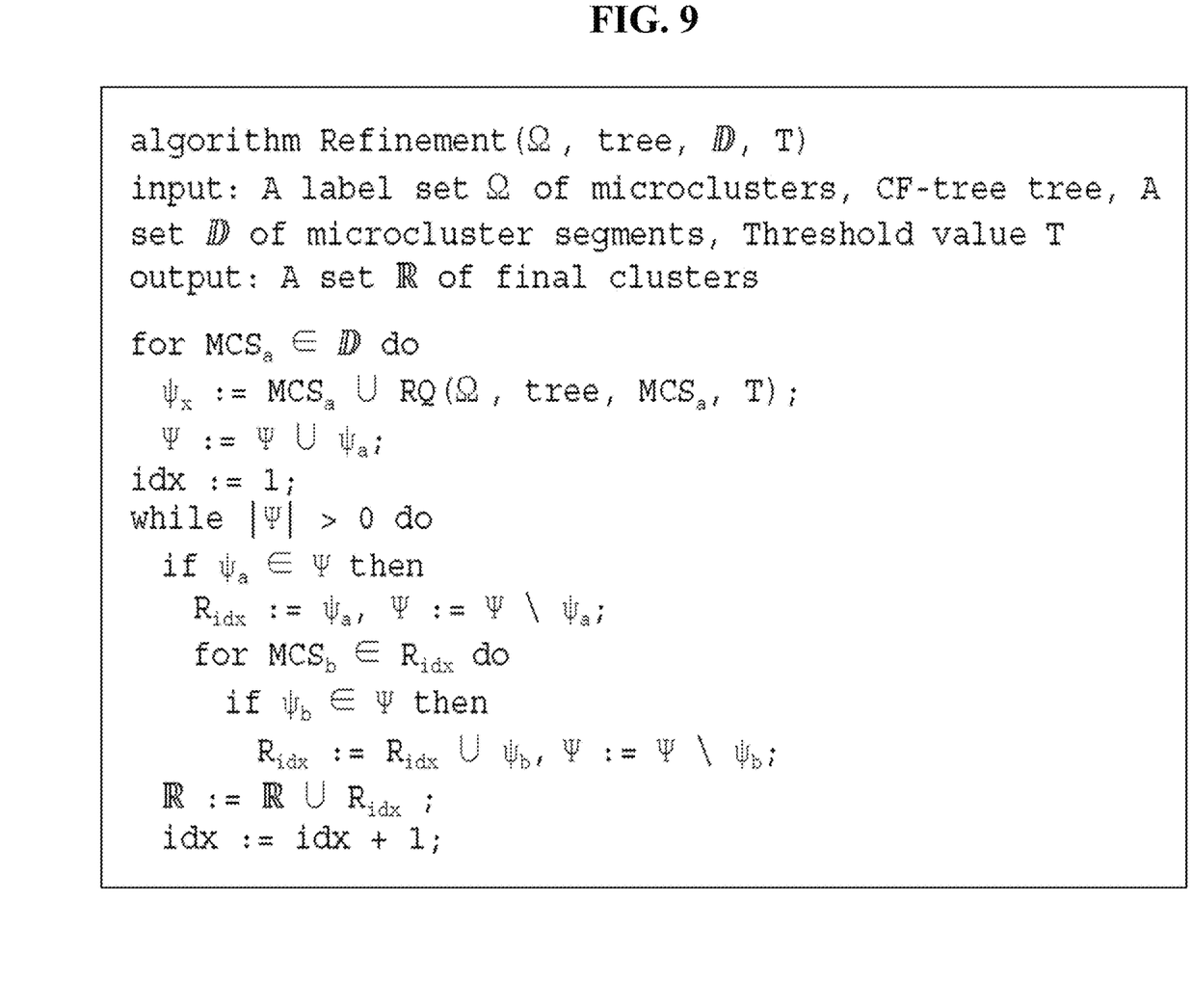
FIG. 9 is a diagram illustrating an algorithm for a process of generating a cluster set by performing a range query on a micro cluster segment in the data clustering apparatus of FIG. 1.

FIG. 9 is a diagram illustrating an algorithm for a process of generating a cluster set by performing a range query on an MCS in the data clustering apparatus of FIG. 1.

Referring to FIG. 9, the data clustering apparatus 130 may perform a range query-based clustering method using a CF tree through the cluster set generation unit 250. In particular, the cluster set generation unit 250 may perform a range query on an MCS and perform clustering, using the algorithm of FIG. 9. In FIG. 9, a set D of MCSs in input data may correspond to a set regarding MCSs generated by the MCS generation unit 230, and RQ corresponds to a range query. The RQ may provide a set of MCSs directly connected to an MCS input as a query key, that is, a partial cluster set, as results.

The disclosed technology may have the following effects. However, it is not meant that a specific embodiment must include all the following effects or include only the following effects, and thus the range of the right of the disclosed technology should not be construed as being restricted by the embodiment.

The data clustering apparatus and method based on a range query using a CF tree according to embodiments of the present invention can provide high clustering performance suitable for a set of a large amount of data through a segmentation and refinement process for an MC configuring a CF tree.

The data clustering apparatus and method based on a range query using a CF tree according to embodiments of the present invention can perform effective data clustering by generating an MCS based on an IMD and detecting a directly or indirectly connected MCS through a range query.

Although the embodiments of the present invention have been described above, those skilled in the art will understand that the present invention may be modified and changed in various ways without departing from the spirit and scope of the present invention described in the claims.

What is claimed is:

1. A data clustering apparatus based on a range query using a clustering feature (CF) tree, the apparatus comprising:
   a CF tree construction unit configured to construct a CF tree, comprising a leaf node configured with a micro cluster (MC) and an index node configured with a sub-cluster (SC), based on a plurality of data included in a data set;

a micro cluster segment (MCS) generation unit configured to generate an MCS based on a distance between the MCs while sequentially searching the leaf node from a leftmost leaf node to right; and a cluster set generation unit configured to generate a cluster set by performing a range query on the MCS, wherein the range query determines a plurality of MC candidates which overlap a range area and are included in an external MCS different than the MCS, wherein the range area includes a sum of a radius of the MCS and a threshold distance as a radius based on a centroid of the MCS, and wherein the CF tree construction unit, the micro cluster segment MCS generation unit, and the cluster set generation unit are each implemented via at least one processor.

2. The apparatus of claim 1, wherein the CF tree construction unit is configured to calculate a radius for the SC after the construction is completed.

3. The apparatus of claim 2, wherein the CF tree construction unit is configured to use an average radius of a corresponding MC if a child of the SC is an MC and to use a radius of a corresponding SC if a child of the SC is an SC in the calculation of the radius.

4. The apparatus of claim 1, wherein the MCS generation unit is configured to calculate the inter-MC distance (IMD) using an equation below.

$$IMD(MCx, MCy) = ED(c(MCx), c(MCy)) - (ar(MCx) + ar(MCy)) \quad \text{[Equation]}$$

wherein MCx and MCy correspond to MCs, c(MC) and ar(MC) correspond to a centroid and average radius of a corresponding MC, and ED(c(MCx), c(MCy)) corresponds to an Euclidean distance (ED) between centroids of two MCs.

5. The apparatus of claim 1, wherein the MCS generation unit is configured to add first and second MCs to an identical MCS if a distance between the first and second MCs is smaller than a threshold distance.

6. The apparatus of claim 1, wherein the MCS generation unit is configured to calculate a centroid of the MCS as an average value of centroids of a plurality of MCs included in the MCS and to calculate a radius of the MCS as a greatest value of sums of a distance from a centroid of the MCS to a centroid of each MC and an average radius of each MC.

7. The apparatus of claim 1, wherein the cluster set generation unit is configured to add an external MCS, comprising a corresponding MC candidate, to a partial cluster set associated with the MCS if a distance between the MC candidate and at least one of MCs included in the MCS is within the threshold distance.

8. The apparatus of claim 7, wherein the cluster set generation unit is configured to generate the cluster set by integrating a plurality of partial cluster sets, comprising an identical MCS, into one cluster set.

9. A data clustering method based on a range query using a clustering feature (CF) tree, the method performed by a data clustering apparatus comprising:

constructing a CF tree, comprising a leaf node configured with a micro cluster (MC) and an index node configured with a sub-cluster (SC), based on a plurality of data included in a data set;

generating an MCS based on a distance between the MCs while sequentially searching the leaf node from a leftmost leaf node to right; and generating a cluster set by performing a range query on the MCS, wherein the range query determines a plurality of MC candidates which overlap a range area and are included in an external MCS different than the MCS, and wherein the range area includes a sum of a radius of the MCS and a threshold distance as a radius based on a centroid of the MCS.

10. A non-transitory computer-readable medium having embodied thereon a program, which when executed by a computer causes the computer to execute a data clustering method based on a range query using a clustering feature (CF) tree, the method comprising:

constructing a CF tree, comprising a leaf node configured with a micro cluster (MC) and an index node configured with a sub-cluster (SC), based on a plurality of data included in a data set;

generating an MCS based on a distance between the MCs while sequentially searching the leaf node from a leftmost leaf node to right; and generating a cluster set by performing a range query on the MCS, wherein the range query determines a plurality of MC candidates which overlap a range area and are included in an external MCS different than the MCS, and wherein the range area includes a sum of a radius of the MCS and a threshold distance as a radius based on a centroid of the MCS.

* * * * *